United States Patent
Yang et al.

(10) Patent No.: US 12,430,063 B2
(45) Date of Patent: Sep. 30, 2025

(54) METADATA MANAGEMENT DURING AN INTERMEDIATE PERSISTENT STORAGE FAILURE DURING STARTUP

(71) Applicant: Dell Products L.P., Round Rock, TX (US)

(72) Inventors: Yue Yang, Beijing (CN); Yousheng Liu, Beijing (CN); Chun Ma, Beijing (CN)

(73) Assignee: Dell Products L.P., Round Rock, TX (US)

( * ) Notice: Subject to any disclaimer, the term of this patent is extended or adjusted under 35 U.S.C. 154(b) by 160 days.

(21) Appl. No.: 18/225,387

(22) Filed: Jul. 24, 2023

(65) Prior Publication Data
US 2024/0248635 A1    Jul. 25, 2024

(30) Foreign Application Priority Data
Jan. 19, 2023 (CN) .......................... 202310088836.0

(51) Int. Cl.
G06F 3/06 (2006.01)

(52) U.S. Cl.
CPC .......... *G06F 3/0655* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 9,774,401 B1 | 9/2017 | Borrill | |
| 10,235,066 B1 | 3/2019 | Chen et al. | |
| 11,061,818 B1* | 7/2021 | Sorenson | G06F 12/0891 |
| 2015/0019792 A1 | 1/2015 | Swanson et al. | |
| 2015/0082081 A1* | 3/2015 | Akirav | G06F 11/1612 |
| | | | 714/6.22 |
| 2017/0300388 A1* | 10/2017 | Zheng | G06F 11/1464 |
| 2017/0322611 A1* | 11/2017 | Brennan | G06F 3/0625 |
| 2017/0329706 A1* | 11/2017 | Nemawarkar | G06F 3/0605 |
| 2018/0137047 A1* | 5/2018 | Liu | G06F 11/1441 |
| 2020/0250041 A1* | 8/2020 | Wan | G06F 11/1435 |
| 2022/0222155 A1 | 7/2022 | Kamran et al. | |

\* cited by examiner

*Primary Examiner* — Ryan Bertram
*Assistant Examiner* — Edmund H Kwong
(74) *Attorney, Agent, or Firm* — BainwoodHuang

(57) ABSTRACT

Techniques for storing metadata involve: storing first metadata associated with a system operation in a volatile memory of a storage system while the storage system is in a startup stage. The storage system does not perform read/write requests of a client during the startup stage. Such techniques further involve: suspending the system operation of the storage system during the startup stage in response to determining that the intermediate persistent storage device has failed. Such techniques further involve: storing the first metadata in the volatile memory into the persistent storage device. Such techniques further involve: storing the first metadata into the intermediate persistent storage device in response to determining that the intermediate persistent storage device is available again. Accordingly, the risk of losing metadata when the storage device is powered down can be reduced.

20 Claims, 8 Drawing Sheets

METADATA MANAGEMENT DURING AN INTERMEDIATE PERSISTENT STORAGE FAILURE DURING STARTUP

CROSS-REFERENCE TO RELATED APPLICATION

This application claims priority to Chinese Patent Application No. CN202310088836.0, on file at the China National Intellectual Property Administration (CNIPA), having a filing date of Jan. 19, 2023, and having "METHOD OF STORING META DATA, ELECTRONIC DEVICE AND COMPUTER PROGRAM PRODUCT" as a title, the contents and teachings of which are herein incorporated by reference in their entirety.

TECHNICAL FIELD

Embodiments of the present disclosure relate to the field of storage devices, and more particularly, to a method, an electronic device, and a computer program product for storing metadata.

BACKGROUND

In a storage system, user data and metadata associated with the user data are included. The metadata describes a mapping relationship between logical names and physical information of the user data, and contains all block data required for file access control, etc. However, storage devices storing metadata cannot be completely free of failures. A failure of a storage device storing metadata will directly cause the storage system to fail to restart properly, which potentially causes an undesired data disaster.

SUMMARY OF THE INVENTION

Embodiments of the present disclosure provide a solution for storing metadata, which reduces the risk of losing metadata.

In a first aspect of the present disclosure, a method for storing metadata is provided. The method includes: storing first metadata associated with a system operation in a volatile memory of a storage system while the storage system is in a startup stage. The first metadata is to be transferred from the volatile memory to an intermediate persistent storage device of the storage system. Data in the intermediate persistent storage device is to be flushed to the persistent storage device of the storage system. The storage system does not perform read/write requests of a client during the startup stage. The method further includes: suspending the system operation of the storage system during the startup stage in response to determining that the intermediate persistent storage device has failed. The method further includes: storing the first metadata in the volatile memory into the persistent storage device. The method further includes: storing the first metadata into the intermediate persistent storage device in response to determining that the intermediate persistent storage device is available again.

In a second aspect of the present disclosure, an electronic device is provided. The electronic device includes a processor; and a volatile memory coupled to the processor. The memory has instructions stored therein, wherein the instructions, when executed by the processor, cause the device to perform actions. The actions include: storing first metadata associated with a system operation in the volatile memory while a storage system is in a startup stage. The first metadata is to be transferred from the volatile memory to an intermediate persistent storage device of the storage system. Data in the intermediate persistent storage device is to be flushed to the persistent storage device of the storage system. The actions further include: suspending the system operation of the storage system during the startup stage in response to determining that the intermediate persistent storage device has failed. The actions further include: storing the first metadata in the volatile memory into the persistent storage device. The actions further include: storing the first metadata into the intermediate persistent storage device in response to determining that the intermediate persistent storage device is available.

In a third aspect of the present disclosure, a computer program product is provided. The computer program product is tangibly stored on a computer-readable medium and includes machine-executable instructions. The machine-executable instructions, when executed, cause a machine to perform the method according to the first aspect.

The Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, wherein identical reference numerals generally represent identical components in the example embodiments of the present disclosure. In the accompanying drawings.

DETAILED DESCRIPTION

Figure 1A:
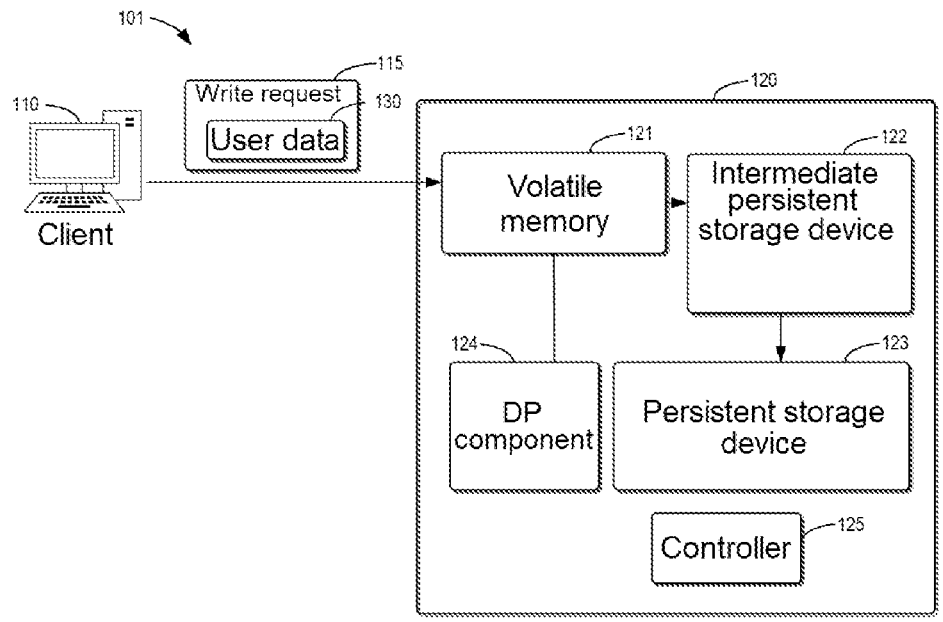
FIGS. 1A-1D illustrate schematic diagrams of an example environment in which embodiments of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles of the present disclosure will be described below with reference to several example embodiments illustrated in the accompanying drawings. Although the drawings show preferred embodiments of the present disclosure, it should be understood that these embodiments are merely described to enable those skilled in the art to better understand and further implement the present disclosure, and not to limit the scope of the present disclosure in any way.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As discussed above, there is a risk of losing metadata in a storage system when the storage system is powered down. In some storage systems, metadata will be stored on a non-volatile intermediate storage device before being synchronized to a back-end storage device and, later, flushed to the back-end persistent storage device. However, if there is still metadata stored on volatile memory when the intermediate storage device is powered down, this metadata will be lost after the system restarts. In this regard, conventionally, in the process of performing a read/write operation by the storage system and if the intermediate storage device is powered down, the storage system will suspend the current operation and save data stored on the volatile memory to the back-end persistent storage device. After that, when the intermediate storage device is restored, the data stored on the persistent storage device is then saved back to the volatile memory, and the system is restarted. After the system restarts, the data stored on the volatile memory is then stored to the back-end persistent storage device.

However, if the intermediate storage device is powered down again during the initialization stage after the system restarts, the data recovery fails, and the system will restart again. At this point, as new metadata is generated during system initialization, this part of metadata may be stored on a volatile memory and not saved. When the system is restarted again, the new metadata that has not been saved will be lost.

In view of this, embodiments of the present disclosure propose a solution for storing metadata to solve one or more of the above problems and other potential problems. In this solution, if the intermediate persistent storage device is powered down during the startup stage of the storage system, all current initialization operations of the storage system are suspended to avoid further generation of new metadata. After the system operations in the storage system are suspended, the metadata stored in the volatile memory is transferred to the persistent storage device. After the intermediate persistent storage device is restored, the transferred metadata can be stored back to the intermediate persistent storage device to enable the storage system to operate normally. In this manner, the risk of losing metadata when the storage device is powered down can be reduced.

FIGS. 1A to 1D illustrate schematic diagrams of an example process of performing a write request by an example system in which embodiments of the present disclosure can be implemented. As shown in FIG. 1A, example system 101 includes client 110 and storage system 120. Storage system 120 includes, in general, multiple levels of storage devices, for example, volatile memory 121, intermediate persistent storage device 122, and persistent storage device 123. In addition, storage system 120 further includes DP component 124 in a Data Path (DP), and controller 125 that controls the storage system. It should be understood that the architecture and functions of environment 100 are described for example purposes only, and do not imply any limitation to the scope of the present disclosure. The embodiments of the present disclosure may also be applied to environments involving data protection systems and having different structures and/or functions.

Volatile memory 121 may include any suitable volatile memory, such as dynamic random access memory (DRAM). Intermediate persistent storage device 122 may include any suitable non-volatile cache, such as non-volatile random access memory (NVRAM). Persistent storage device 140 may include one or more storage disks, for example, a solid state disk (SSD), a magnetic disk, or an optical disk. It should be understood that the implementations of volatile memory 121, intermediate persistent storage device 122, and persistent storage device 123 described herein are merely examples and are not intended to limit the scope of the present disclosure. Any type of memory can be selected depending on specific application scenarios to implement volatile memory 121, intermediate persistent storage device 122, and persistent storage device 123.

Figure 1B:
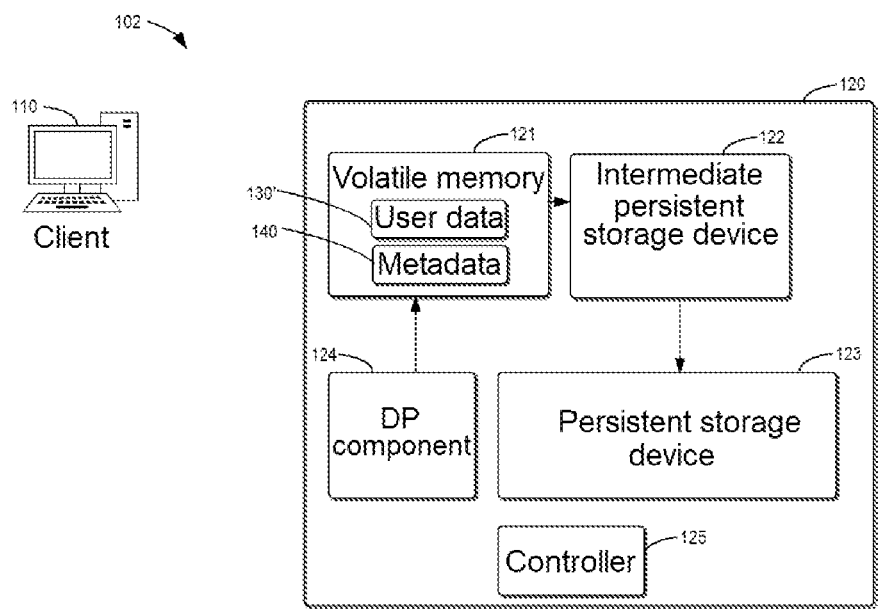
Figure 1C:
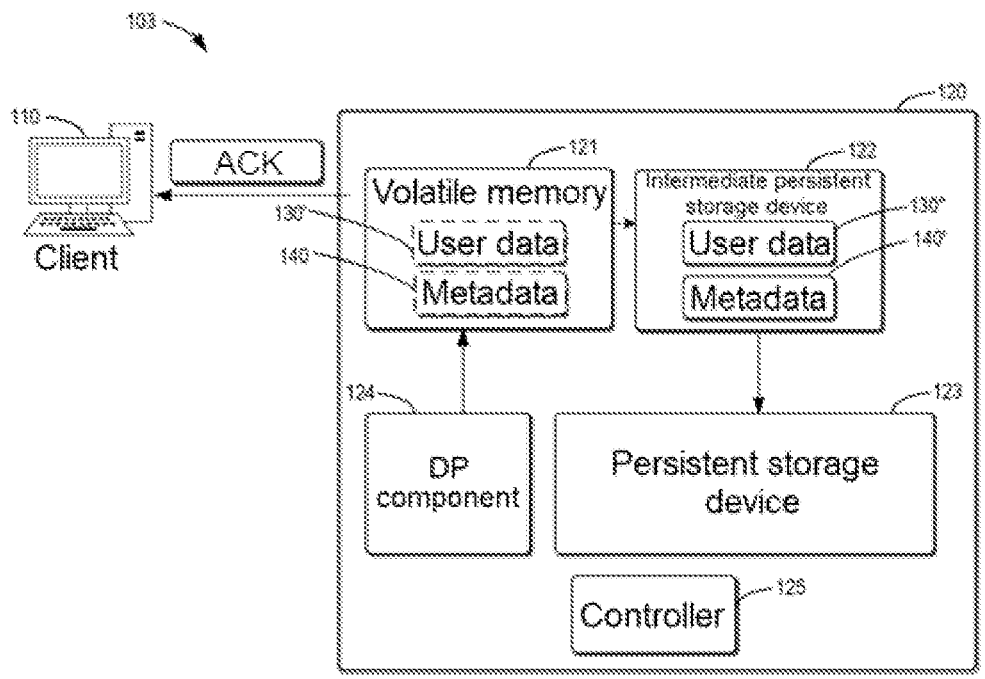
Figure 1D:
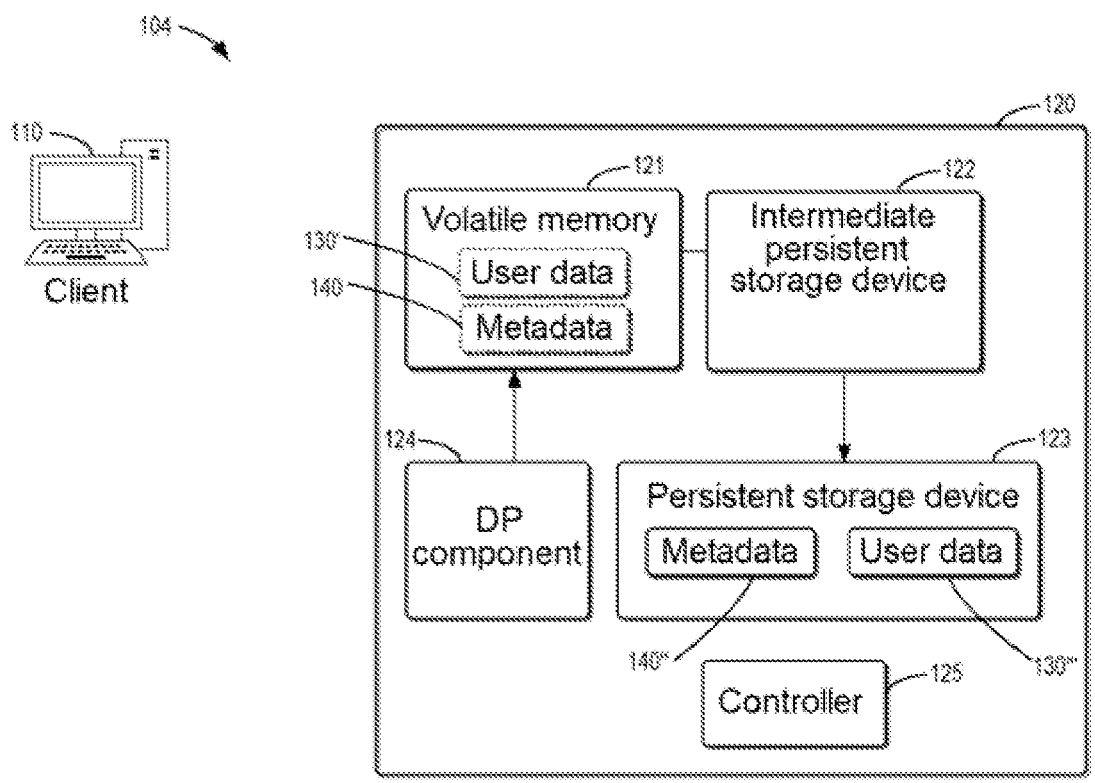

In the embodiment shown in FIG. 1A, client 110 sends write request 115 to storage system 120. Write request 115 includes user data 130 that is to be stored into storage system 120. As shown in FIG. 1B, when storage system 120 receives incoming write request 115, user data 130 is stored as user data 130' in volatile memory 121. In addition, metadata 140 is generated when user data 130 is written. Metadata 140 associated with user data 130 is also stored in volatile memory 121. Afterwards, as shown in FIG. 1C, user data 130' and metadata 140 are transferred to intermediate persistent storage device 122 and stored as user data 130" and metadata 140', and acknowledgment information indicating the completion of the write operation is fed back to client 110. At this point, it is possible that user data 130" and metadata 140 are still stored in volatile memory 121. Finally, for example, when the data in intermediate persistent storage device 122 accumulates to a certain amount, user data 130" and metadata 140' are flushed to persistent storage device 123 and stored as user data 130' and metadata 140". It should be understood that the write operation illustrated in FIGS. 1A to 1D is only an example and that the client may also send a read request to storage system 120, which is not limited by the present disclosure.

Figure 2:
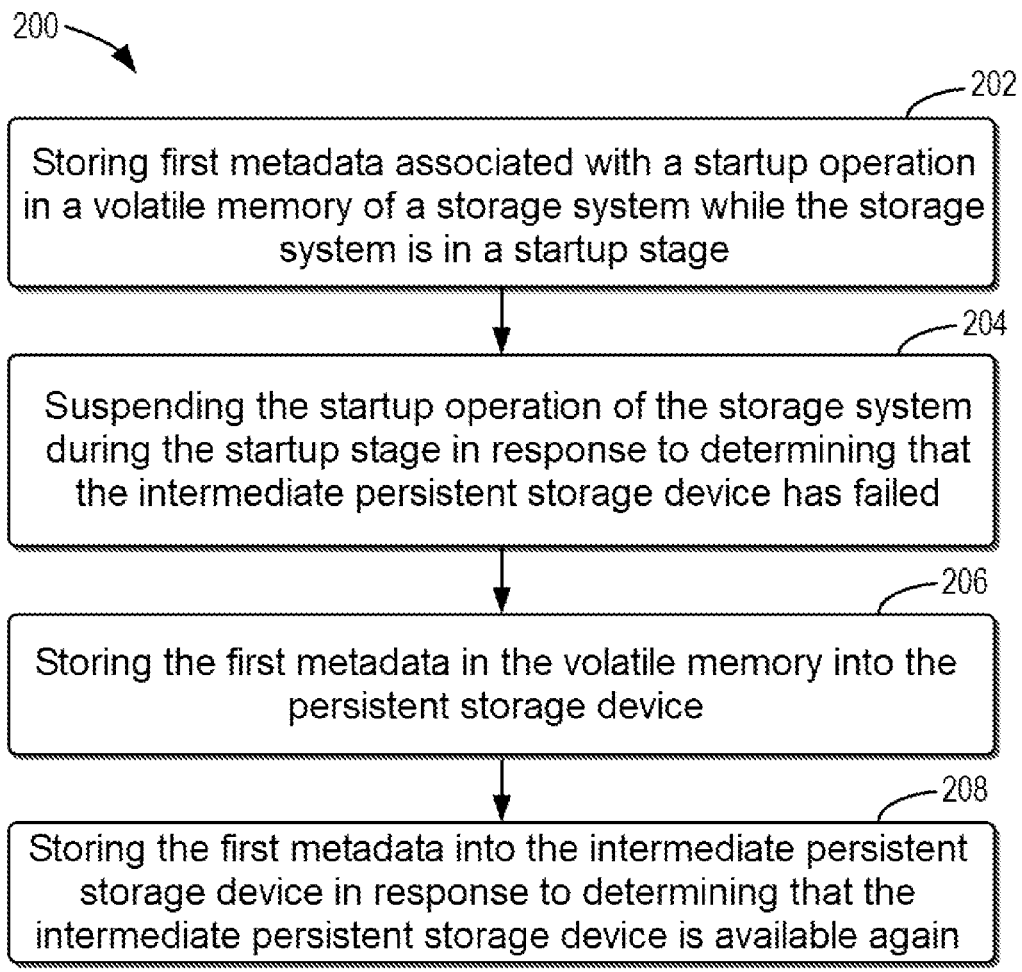
FIG. 2 illustrates a flow chart of an example method for storing metadata according to an embodiment of the present disclosure.

Example embodiments of the present disclosure will be described in detail below with reference to FIGS. 2 to 6 and in conjunction with FIGS. 1A to 1D. FIG. 2 illustrates a flow chart of example method 200 for storing metadata according to an embodiment of the present disclosure. Method 200 may be performed, for example, by controller 125 in FIGS. 1A to 1D.

As shown in FIG. 2, at 202, controller 125 stores first metadata associated with a system operation in volatile memory 121 of storage system 120 while storage system 120 is in a startup stage. Here, the first metadata is to be transferred from volatile memory 121 to intermediate persistent storage device 122 of storage system 120, and data in intermediate persistent storage device 122 is to be flushed to persistent storage device 123 of storage system 120. Storage system 120 does not perform read/write requests of a client during the startup stage.

During the startup stage after storage system 120 is restarted, system operations of storage system 120 may include, for example, initialization of individual DP components 124 in a data path for reading and writing data as well as read/write operations within the system. During the initialization process, new metadata (also referred to as first metadata) is generated. The new metadata may also be a change to the original metadata. During the startup stage, the newly generated metadata is stored in volatile memory 121.

At 204, controller 125 suspends the system operation of storage system 120 during the startup stage upon determining that intermediate persistent storage device 122 has failed. At this point, controller 125, for example, temporarily stops performing all operations, such as the initialization operations for individual DP components 124. In some embodiments, controller 125 may suspend the currently running transactions such as data processing, internal read/write operations, and the like, and perform a rollback. Controller 125 may also wait for the commission and failure of the current transactions. Transaction completion, suspension, or failure all indicate the end of the current transactions, thereby causing storage system 120 to stop generating new metadata.

At 206, controller 125 stores the first metadata in volatile memory 121 into persistent storage device 123. After the system operations in storage system 120 have stopped and it is ensured that no new metadata is generated, the first metadata stored in volatile memory 121 that has not yet been stored into intermediate persistent storage device 122 is stored in persistent storage device 123, so that the first metadata will not be lost during the subsequent restart. In some embodiments, controller 125 may configure persistent storage device 123 in storage system 120 to cause persistent storage device 123 to perform read/write requests only for storage space in persistent storage device 123 that is used to store dirty data. In some embodiments, specific storage space is reserved in persistent storage device 123 for storing dirty data that has not been flushed to persistent storage device 123 when the device is powered down. Here, persistent storage device 123 may be degraded so as to only accept read/write accesses for the specific storage space, for example, a request to write the first metadata to that specific storage space.

At 208, controller 125 stores the first metadata into intermediate persistent storage device 122 when intermediate persistent storage device 122 is available again. For example, the first metadata is first stored to volatile memory 121 and later stored from volatile memory 121 to intermediate persistent storage device 122 for subsequent operations.

In this manner, by suspending the system operations when intermediate persistent storage device 122 fails, generation of new metadata can be prevented, after which all metadata stored in the volatile memory is first input to a persistent storage device that has not failed, and finally, when the intermediate persistent storage device recovers, the saved metadata is written back to the intermediate persistent storage device, thereby avoiding data loss when the intermediate persistent storage device is powered down.

In some embodiments, volatile memory 121 of storage system 120 may also store user data. In such a case, if the intermediate persistent storage device fails during the startup stage, the user data in the volatile memory is discarded. Since there is no new user data during the startup stage, the user data stored in the specific storage space can be used during the subsequent recovery of the data. The user data was transferred from volatile memory 121 to persistent storage device 123 when intermediate persistent storage device 122 failed prior to the startup stage.

It should be understood that method 200 may also include additional actions not shown and/or may omit actions shown, and the scope of the present disclosure is not limited in this regard.

Figure 3A:
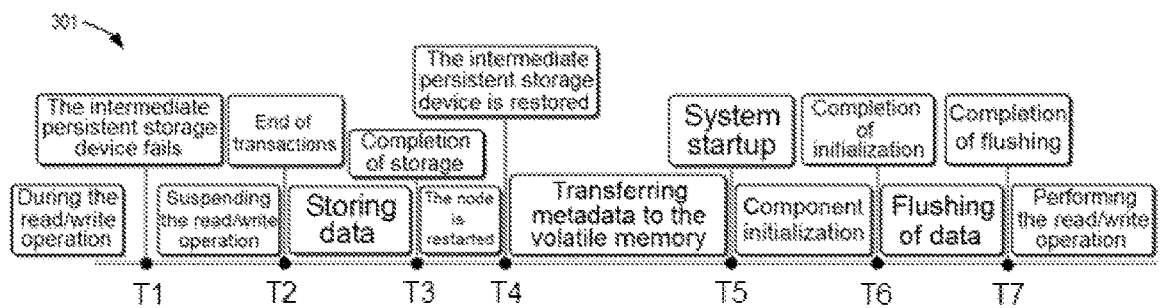
FIGS. 3A-3B illustrate schematic diagrams of an example process of storing metadata according to some embodiments of the present disclosure.

FIG. 3A illustrates a schematic diagram of example process 301 of storing metadata according to some embodiments of the present disclosure. As shown in FIG. 3A, during a normal read/write operation, at time T1, the intermediate persistent storage device fails. At this point, the read/write operation is suspended, that is, the storage system temporarily stops performing the read/write operation and waits for the end of all the currently ongoing transactions. At time T2, when all transactions are finished, the unsaved data that is currently stored in the volatile memory is stored into specific storage space in a persistent storage device. The process of storing data will be described in detail below with reference to FIG. 4A.

Figure 3B:
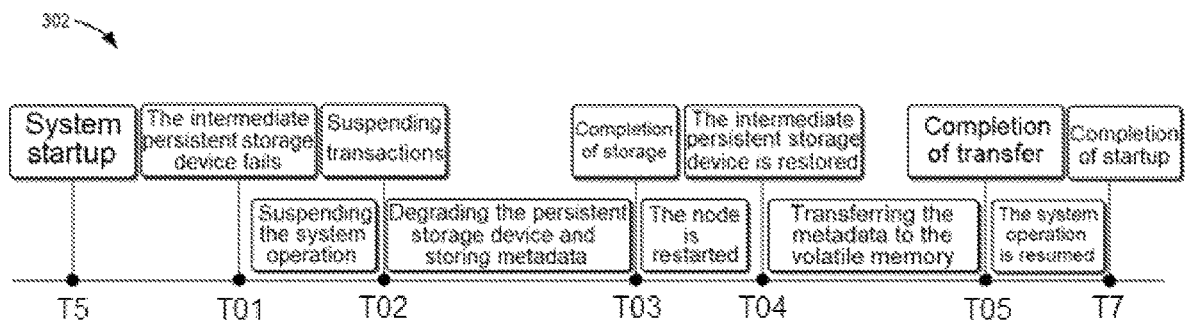
Figure 4A:
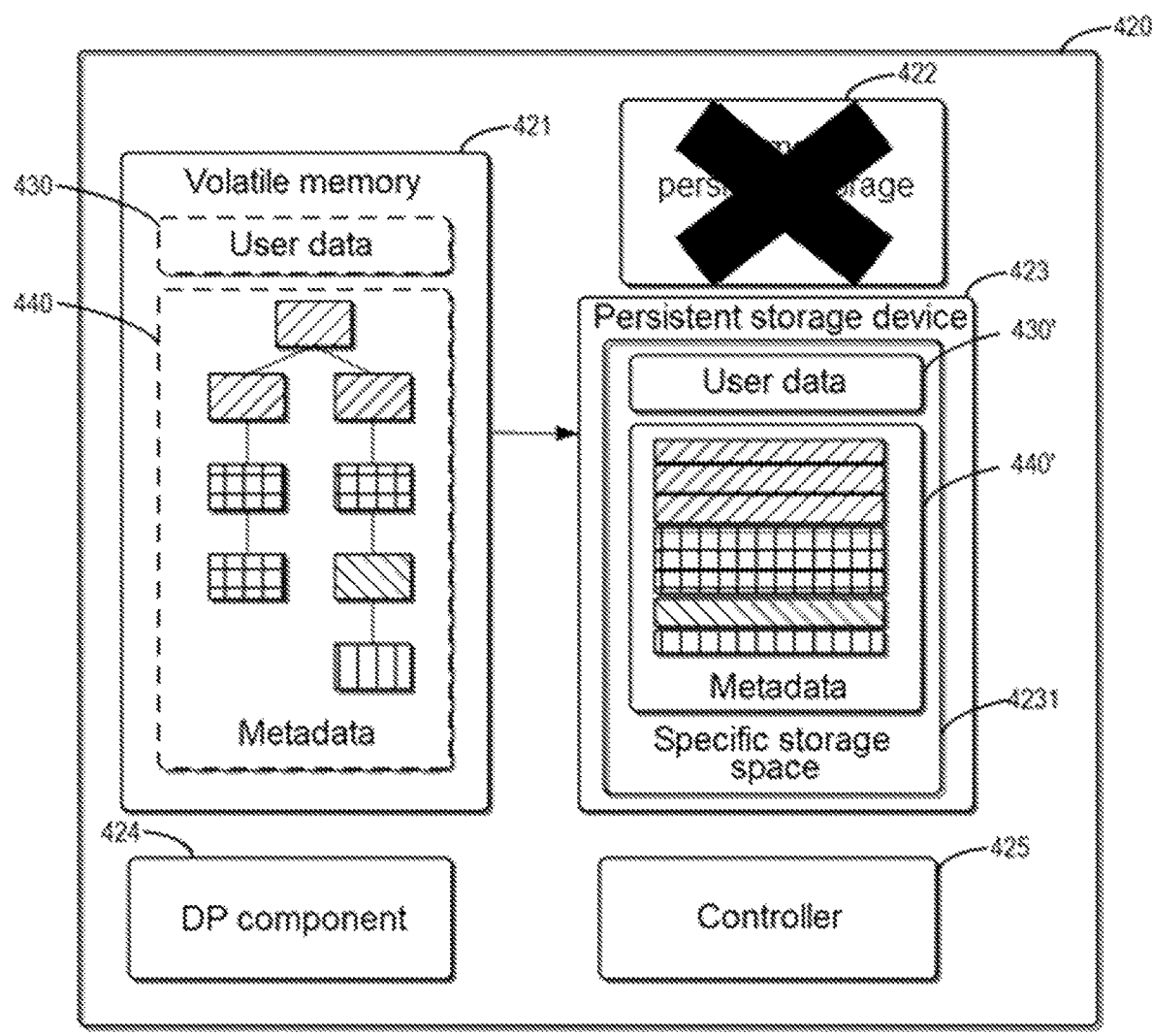
FIGS. 4A-4C illustrate schematic diagrams of an example system according to some embodiments of the present disclosure.

FIG. 4A illustrates a schematic diagram of example system 420 according to some embodiments of the present disclosure from time T2 to time T3 of example process 301. As shown in FIG. 4A, storage system 420 includes volatile memory 421, intermediate persistent storage device 422, persistent storage device 423, DP component 424, and controller 425. It should be understood that storage system 420 has the same structure as that of storage system 120 shown in FIG. 1A, and the two perform the same operations and implement the same functions. In this embodiment, intermediate persistent storage device 422 fails, and user data 430 and metadata 440 (also referred to as second metadata) are stored in volatile memory 421. Metadata 440 is stored in volatile memory 421 in the form of a high-efficiency data structure (HBSB) as a tree structure including initial data and data modifications. Specific storage space 4231 for storing dirty data is provided in persistent storage device 423. Specific storage space 4231 may, for example, be preset in an area of persistent storage device 423 that is not accessible to a user and will not be affected in the event of a device failure. After metadata 440 is stored into specific storage space 4231, metadata 440' in specific storage space 4231 has a different organizational form than that of metadata 440, but they are the same. In addition, user data 430 is stored as user data 430' in the same form in specific storage space 4231. FIGS. 3A and 3B continue to be described below in conjunction with FIGS. 4A to 4C.

Returning to FIG. 3A, at time T3, when the data storage is completed, the storage node of intermediate persistent storage device 422 is restarted after intermediate persistent storage device 422 is repaired or replaced. At time T4, intermediate persistent storage device 422 is restored. At this point, the transfer of metadata 440' and user data 430' stored in specific storage space 4231 to volatile memory 421 begins. When it is confirmed that the transfer of all data is completed, at time T5, storage system 420 is restarted. After the system starts, the initialization of DP component 424 begins. At time T6, when the initialization is completed, flushing of the data stored in volatile memory 421 begins, that is, the data is first stored into intermediate persistent storage device 422 and then stored from intermediate persistent storage device 422 to persistent storage device 423. At time T7, the flushing of all data is completed, and storage system 420 can continue the read/write operation to enter the read/write stage again, i.e., provide read/write services. The time from time T5 to time T7 corresponds, for example, to the startup stage of storage system 420.

In the course from T5 to T7, if the intermediate persistent storage device fails again, the method for storing metadata according to some embodiments of the present disclosure as shown, for example, in FIG. 2 will be triggered.

FIG. 3B illustrates a schematic diagram of example process 302 of storing metadata according to some embodiments of the present disclosure during the time period from T5 to T7 in FIG. 3A. As shown in FIG. 3B, after storage system 420 starts at time T5, at time T01, intermediate persistent storage device 422 fails again, at which point all system operations in storage system 420 are suspended and wait for the end of the currently ongoing transactions. At time T02, it is determined that all transactions have been finished, and writing of the data stored in volatile memory 421 to specific storage space 4231 begins. Specifically, first, persistent storage device 423 is degraded so that it only accepts read/write requests for specific storage space 4231 and no other read/write requests. The process of storing data will be described in detail below with reference to FIG. 4B.

Figure 4B:
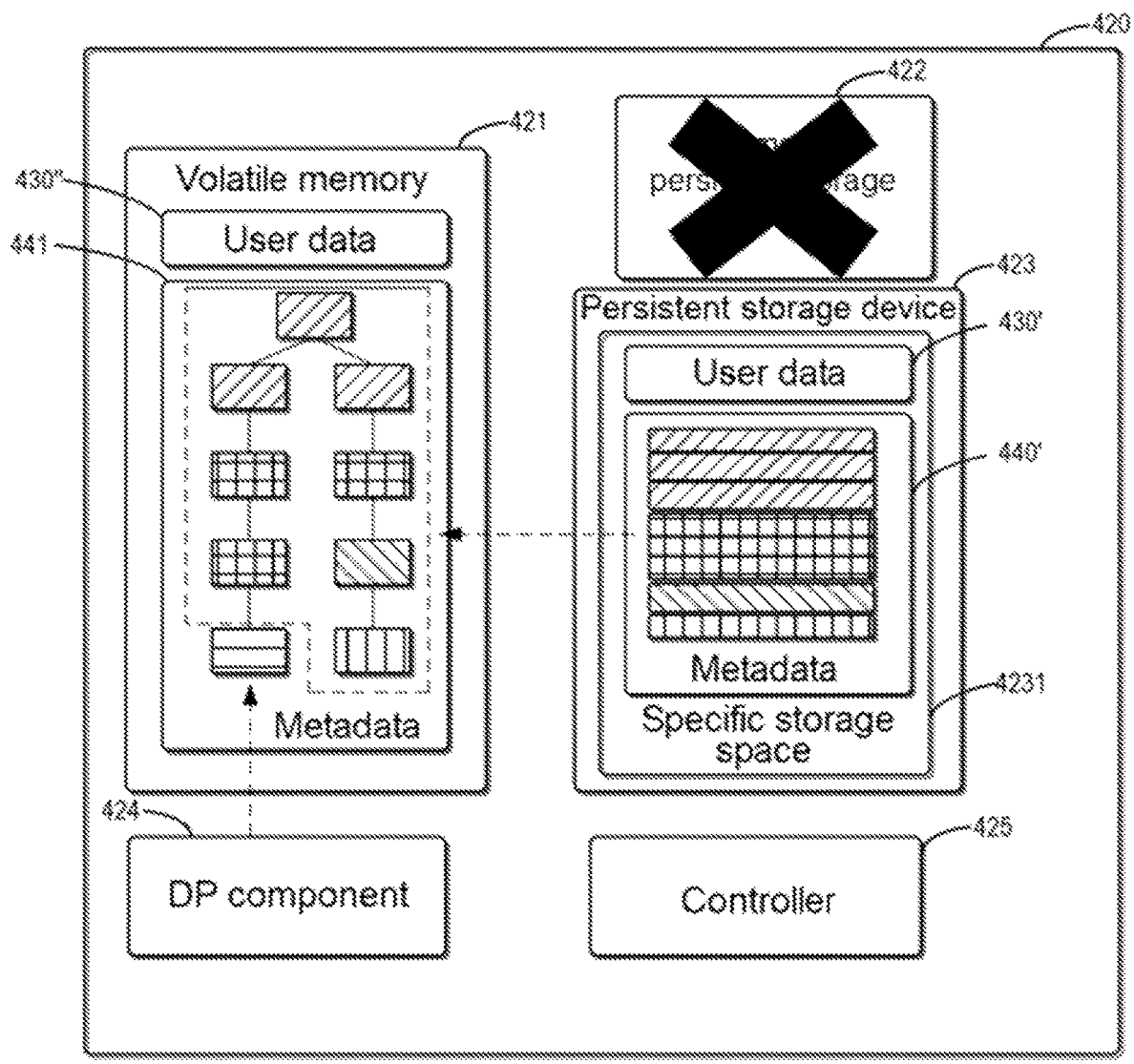

FIG. 4B illustrates a schematic diagram of example system 420 according to some embodiments of the present disclosure at time T02 of example process 302. As shown in FIG. 4B, at time T02, user data 430' and metadata 440' stored in specific storage space 4231 are the same as at time T3 shown in FIG. 3A without any change. At this point, metadata 441 in the form of HBSB and user data 430" are stored in volatile memory 421. Since storage system 420 no longer accepts requests from clients from time T2, user data 430" is the same as user data 430 and user data 430'. In contrast, metadata 441 includes two parts, wherein the part indicated by the dashed box is the same as metadata 440', and the part outside the dashed box is the new metadata generated by DP component 424 from time T5 to time T02. Since the metadata stored in volatile memory 421 has changed relative to the metadata in specific storage space 4231, it is also necessary to save metadata 441 again in order not to lose the new metadata during subsequent restarts. On the other hand, the user data has remained unchanged, so there is no need to save the user data again. After a subsequent restart, it is still possible to make use of user data 430' that is stored in specific storage space 4231 from times T2 to T3 due to the failure at time T1.

Figure 4C:
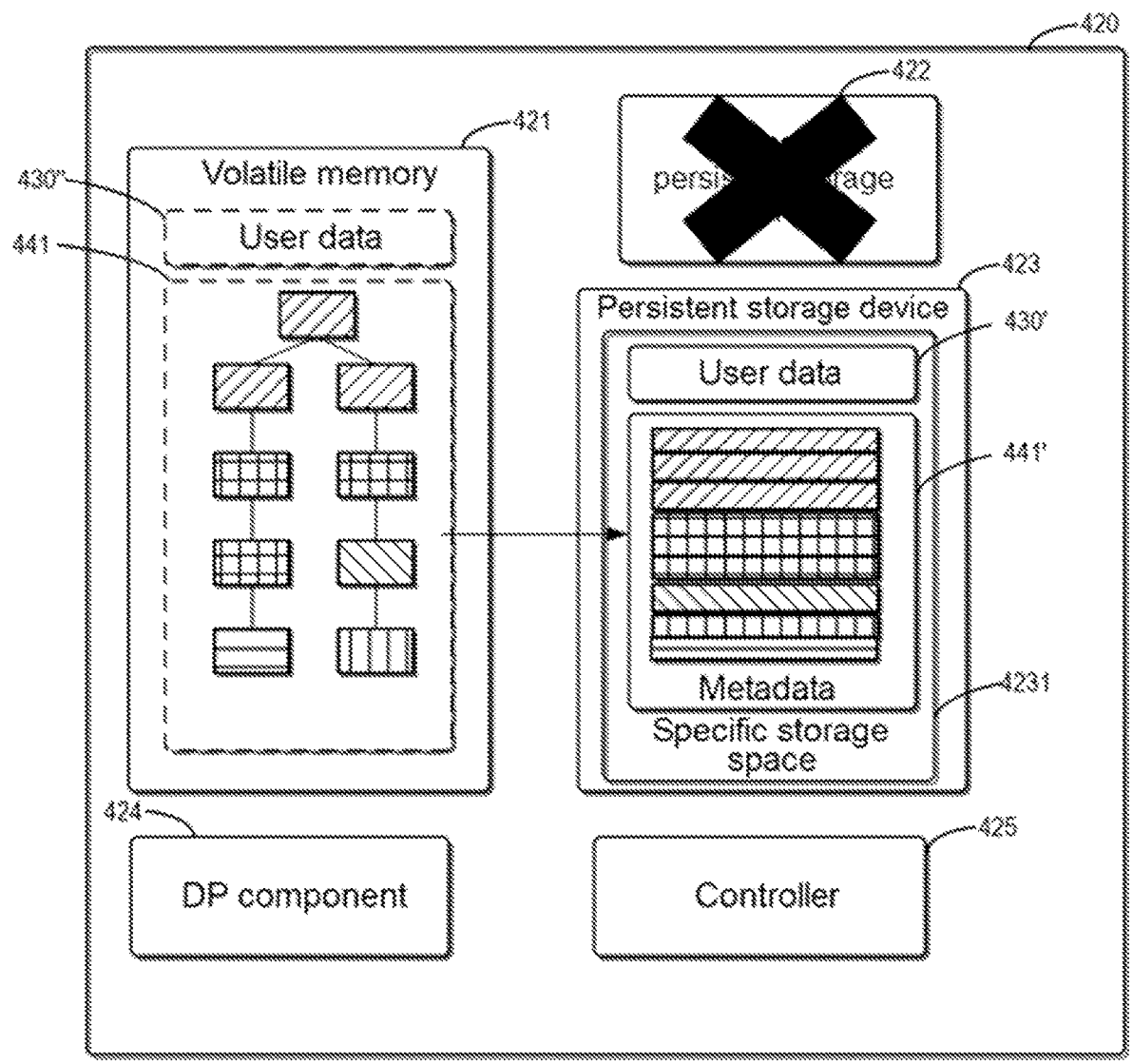

Returning to FIG. 3B, at time T03, persistent storage device 422 is degraded, and only metadata 441 stored in volatile memory 421 will be written to specific storage space 4231 of persistent storage device 422. This process of storing data will be described in detail below with reference to FIG. 4C. FIG. 4C illustrates a schematic diagram of example system 420 according to some embodiments of the present disclosure at time T03 of example process 302. As shown in FIG. 4C, metadata 441 in the form of HBSB in volatile memory 421 is stored in specific storage space 4231 as metadata 441' suitable for the structure of specific storage space 4231. Meanwhile, user data 430" is not written again since user data 430' that is the same as user data 430" has been stored in persistent storage device 423.

Returning again to FIG. 3B, at time T03, when the storage of the metadata to the specific storage space is completed and it is determined that the intermediate persistent storage device is repaired or replaced, the data node of the intermediate persistent storage device is restarted. At time T04, the intermediate persistent storage device is restored for use. At this point, metadata 441' and user data 430' stored in specific storage space 4231 are transferred to volatile memory 421. At time T05, at the completion of the transfer, the system operation that was suspended at time T01 is resumed. For example, if intermediate persistent storage device 422 failed between time T5 and time T6, the suspended system operation is the startup operation of storage system 420. Thus, at time T05, the startup operation of storage system 420 is resumed and, upon completion of the startup, all current data stored in volatile memory 421 is flushed to persistent storage device 423 (corresponding to the operation between times T6 and T7 in FIG. 3A). If intermediate persistent storage device 422 failed between time T6 and time T7, it is the flushing operation of the data that is suspended at time T01. Therefore, at time T05, the flushing operation of storage system 420 is resumed in order to flush all the data stored in volatile memory 421 to persistent storage device 423. When the data flushing is completed, the recovery of metadata after the failure of storage system 420 is completed, and at this point, read/write services can be provided.

Figure 5:
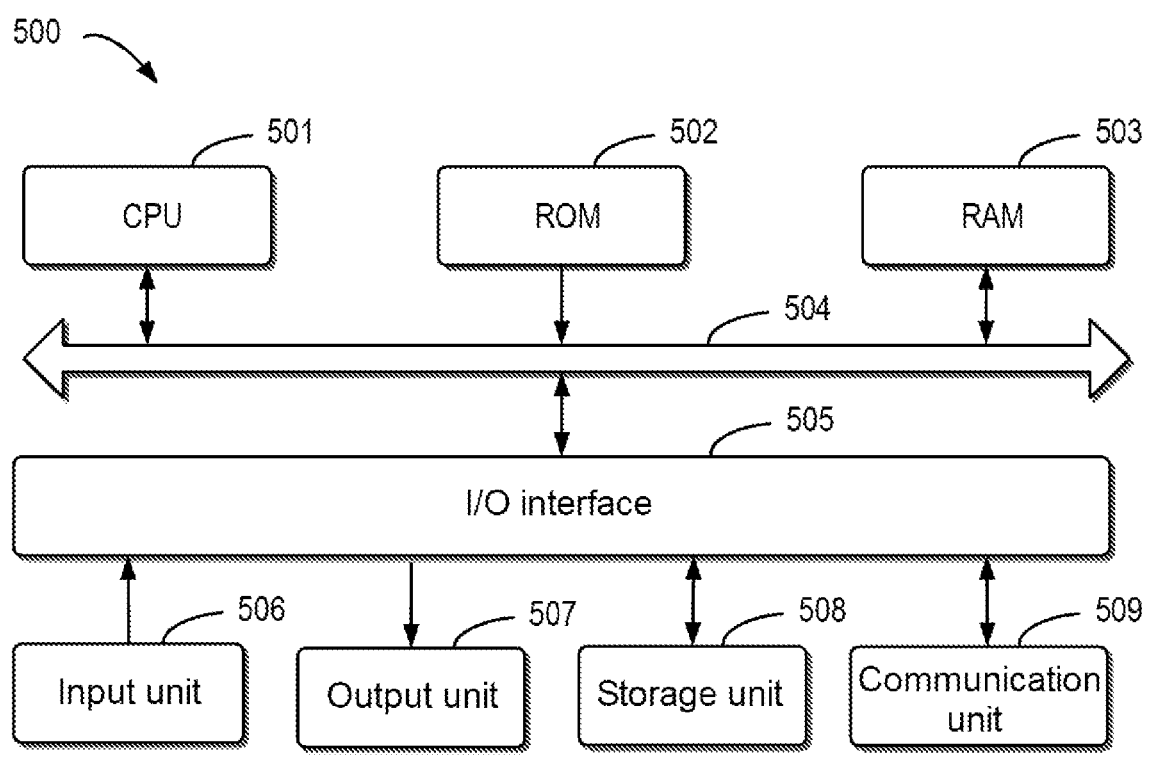
FIG. 5 illustrates a block diagram of an example device that can be used to implement embodiments of the present disclosure.

FIG. 5 illustrates a schematic block diagram of example device 500 that may be used to implement embodiments of the present disclosure. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various processes and processing described above, such as method 200, may be performed by processing unit 501. For example, in some embodiments, method 200 may be implemented as a computer software program that is tangibly contained in a machine-readable medium, such as storage unit 508. In some embodiments, part of or all the computer program may be loaded and/or installed to device 500 via ROM 502 and/or communication unit 509. When the computer program is loaded to RAM 503 and executed by CPU 501, one or more actions of methods 200 and 700 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, so that these instructions, when executed by the processing unit of the computer or the further programmable data processing apparatus, produce means (e.g., specialized circuitry) for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, so that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

The invention claimed is:

1. A method for storing metadata, comprising:
performing, by a storage system during an initialization stage after the storage system restarts, one or more initialization operations for initializing one or more data path (DP) components in a data path of the storage system, the one or more DP components being configured to perform a plurality of read/write operations within the storage system, the one or more initialization operations including generating first metadata associated with the initializing of the one or more DP components;
storing the first metadata in a volatile memory of the storage system while the storage system is in the initialization stage, wherein the first metadata is to be transferred from the volatile memory to an intermediate persistent storage device of the storage system, and data in the intermediate persistent storage device is to be flushed to a persistent storage device of the storage system;
in response to determining that the intermediate persistent storage device has failed, preventing the one or more initialization operations from generating additional first metadata by suspending the initializing of the one or more DP components;
storing the first metadata in the volatile memory into the persistent storage device; and
storing the first metadata into the intermediate persistent storage device in response to determining that the intermediate persistent storage device is available.

2. The method according to claim 1, wherein storing the first metadata into the persistent storage device further comprises:
configuring the persistent storage device in the storage system to cause the persistent storage device to perform read/write requests only for storage space in the persistent storage device that is used to store dirty data.

3. The method according to claim 1, wherein the volatile memory of the storage system further stores user data, and wherein the method further comprises:
discarding the user data in the volatile memory during a startup stage in response to determining that the intermediate persistent storage device has failed.

4. The method according to claim 3, further comprising:
storing the user data in the persistent storage device into the intermediate persistent storage device in response to determining that the intermediate persistent storage device is available again,
wherein the user data stored in the persistent storage device was transferred from the volatile memory to the persistent storage device when the intermediate persistent storage device failed prior to the startup stage.

5. The method according to claim 4, further comprising:
flushing the first metadata and the user data stored in the intermediate persistent storage device to the persistent storage device.

6. The method according to claim 5, further comprising:
resuming the initializing of the one or more DP components in response to determining that all metadata in the persistent storage device is stored in the volatile memory.

7. The method according to claim 1, further comprising:
suspending, by the storage system, a read/write operation from among the plurality of read/write operations in response to determining that the intermediate persistent storage device has failed; and
storing second metadata in the volatile memory into the persistent storage device.

8. The method according to claim 1, wherein suspending the initializing of the one or more DP components comprises:
waiting for a completion, suspension, or failure of a current transaction performed in the storage system.

9. An electronic device, comprising:
a controller; and
a volatile memory coupled to the controller, the volatile memory having instructions stored therein, wherein the instructions, when executed by the controller, cause the electronic device to perform actions comprising:
performing, by a storage system during an initialization stage after the storage system restarts, one or more initialization operations for initializing one or more data path (DP) components in a data path of the storage system, the one or more DP components being configured to perform a plurality of read/write operations within the storage system, the one or more initialization operations including generating first metadata associated with the initializing of the one or more DP components;
storing the first metadata in the volatile memory while the storage system is in the initialization stage, wherein the first metadata is to be transferred from the volatile memory to an intermediate persistent storage device of the storage system, and data in the intermediate persistent storage device is to be flushed to a persistent storage device of the storage system;
in response to determining that the intermediate persistent storage device has failed, preventing the one or more initialization operations from generating additional first metadata by suspending the initializing of the one or more DP components;
storing the first metadata in the volatile memory into the persistent storage device; and
storing the first metadata into the intermediate persistent storage device in response to determining that the intermediate persistent storage device is available.

10. The electronic device according to claim 9, wherein storing the metadata into the volatile memory further comprises:
configuring the persistent storage device in the storage system to cause the persistent storage device to perform read/write requests only for storage space in the persistent storage device that is used to store dirty data.

11. The electronic device according to claim 9, wherein the volatile memory of the storage system further stores user data, and wherein the actions further comprise:
discarding the user data in the volatile memory during a startup stage in response to determining that the intermediate persistent storage device has failed.

12. The electronic device according to claim 11, wherein the actions further comprise:
storing the user data in the persistent storage device into the intermediate persistent storage device in response to determining that the intermediate persistent storage device is available again,
wherein the user data stored in the persistent storage device was transferred from the volatile memory to the persistent storage device when the intermediate persistent storage device failed prior to the startup stage.

13. The electronic device according to claim 12, wherein the actions further comprise:

flushing the first metadata and the user data stored in the intermediate persistent storage device to the persistent storage device.

14. The electronic device according to claim 13, wherein the actions further comprise:
  resuming the initializing of the one or more DP components in response to determining that all metadata in the persistent storage device is stored in the volatile memory.

15. The electronic device according to claim 9, wherein the actions further comprise:
  suspending, by the storage system, a read/write operation from among the plurality of read/write operations in response to determining that the intermediate persistent storage device has failed; and
  storing second metadata in the volatile memory into the persistent storage device.

16. The electronic device according to claim 9, wherein suspending the initializing of the one or more DP components comprises:
  waiting for a completion, suspension, or failure of a current transaction performed in the storage system.

17. A computer program product, the computer program product being tangibly stored on a non-transitory computer-readable storage medium and comprising machine-executable instructions, wherein the machine-executable instructions, when executed, cause a machine to perform actions comprising:
  performing, by a storage system during an initialization stage after the storage system restarts, one or more initialization operations for initializing one or more data path (DP) components in a data path of the storage system, the one or more DP components being configured to perform a plurality of read/write operations within the storage system, the one or more initialization operations including generating first metadata associated with the initializing of the one or more DP components;
  storing the first metadata in a volatile memory of the storage system while the storage system is in the initialization stage, wherein the first metadata is to be transferred from the volatile memory to an intermediate persistent storage device of the storage system, and data in the intermediate persistent storage device is to be flushed to a persistent storage device of the storage system;
  in response to determining that the intermediate persistent storage device has failed, preventing the one or more initialization operations from generating additional first metadata by suspending the initializing of the one or more DP components;
  storing the first metadata in the volatile memory into the persistent storage device; and
  storing the first metadata into the intermediate persistent storage device in response to determining that the intermediate persistent storage device is available.

18. The computer program product according to claim 17, wherein storing the first metadata into the persistent storage device further comprises:
  configuring the persistent storage device in the storage system to cause the persistent storage device to perform read/write requests only for storage space in the persistent storage device that is used to store dirty data.

19. The computer program product according to claim 17, wherein the volatile memory of the storage system further stores user data, and wherein the actions further comprise:
  discarding the user data in the volatile memory during a startup stage in response to determining that the intermediate persistent storage device has failed.

20. The computer program product according to claim 19, the actions further comprising:
  storing the user data in the persistent storage device into the intermediate persistent storage device in response to determining that the intermediate persistent storage device is available again,
  wherein the user data stored in the persistent storage device was transferred from the volatile memory to the persistent storage device when the intermediate persistent storage device failed prior to the startup stage.

* * * * *